(12) United States Patent
Pande

(10) Patent No.: US 12,517,469 B2
(45) Date of Patent: Jan. 6, 2026

(54) ELECTRONIC WATCH CHARGING SYSTEM, SMART CHARGING PROCESS, SMART INDUCTIVE POWER BANK, SMART CHARGER SYSTEM FOR CHARGING WHILE IN USE, AND METHOD OF USE

(71) Applicant: Rajendranath Bhavaniprasad Pande, San Francisco, CA (US)

(72) Inventor: Rajendranath Bhavaniprasad Pande, San Francisco, CA (US)

( * ) Notice: Subject to any disclaimer, the term of this patent is extended or adjusted under 35 U.S.C. 154(b) by 0 days.

(21) Appl. No.: 18/271,806

(22) PCT Filed: Dec. 12, 2022

(86) PCT No.: PCT/US2022/052533
§ 371 (c)(1),
(2) Date: Jul. 11, 2023

(87) PCT Pub. No.: WO2024/091262
PCT Pub. Date: May 2, 2024

(65) Prior Publication Data
US 2025/0251702 A1    Aug. 7, 2025

Related U.S. Application Data

(60) Provisional application No. 63/418,721, filed on Oct. 24, 2022.

(51) Int. Cl.
G04G 17/04    (2006.01)
G04G 19/00    (2006.01)
H02J 50/00    (2016.01)
H02J 50/10    (2016.01)

(52) U.S. Cl.
CPC ............. G04G 17/04 (2013.01); G04G 19/00 (2013.01); H02J 50/005 (2020.01); H02J 50/10 (2016.02)

(58) Field of Classification Search
CPC ....... G04G 17/04; G04G 19/00; H02J 50/005; H02J 50/10; H02J 7/342; H02J 7/0044; G04C 10/00
See application file for complete search history.

(56) References Cited

U.S. PATENT DOCUMENTS

| 5,889,737 A | 3/1999 | Alameh | |
|---|---|---|---|
| 10,020,668 B2* | 7/2018 | Adamisin | G04G 19/00 |
| 2012/0194976 A1 | 8/2012 | Golko | |
| 2014/0375246 A1 | 12/2014 | Cuff | |
| 2015/0195009 A1 | 7/2015 | Corematc | |
| 2016/0223992 A1* | 8/2016 | Seo | G04G 19/00 |
| 2017/0033567 A1 | 2/2017 | Apple | |
| 2017/0261943 A1 | 9/2017 | Seiko | |
| 2018/0259914 A1* | 9/2018 | Chae | G04G 19/00 |
| 2020/0343745 A1* | 10/2020 | Choi | H02J 7/0044 |
| 2020/0350774 A1 | 11/2020 | Kim et al. | |

FOREIGN PATENT DOCUMENTS

CN    212878005    3/2021

\* cited by examiner

Primary Examiner — Edwin A. Leon

(57) ABSTRACT

Systems and methods are presented for a smart charger for an electronic device. The smart charger provides for charging a smart device while the smart device continues to be in use and/or used by a user. The smart charger may include features for attaching to a smartwatch, where the smart charger fits between a smart watch and the wrist of a user and/or underneath a smart watch such that the smart watch can continue to be utilized by a user while the smart watch is charging.

19 Claims, 6 Drawing Sheets

ELECTRONIC WATCH CHARGING SYSTEM, SMART CHARGING PROCESS, SMART INDUCTIVE POWER BANK, SMART CHARGER SYSTEM FOR CHARGING WHILE IN USE, AND METHOD OF USE

CROSS-REFERENCE TO RELATED APPLICATION

The present application claims priority to the U.S. Provisional Patent Application No. 62/704,441 which was filed on May 11, 2020, which is hereby incorporated by reference herein in its entirety, including any figures, tables, or drawings.

Furthermore, the present application claims priority to PCT Patent PCT/US22/52533, which was filed on Dec. 12, 2022, which is hereby incorporated by reference herein in its entirety, including any figures, tables, or drawings.

FIELD OF THE DISCLOSURE

This disclosure relates to an electronic watch charging system, a smart inductive power bank, a smart charging process, and a smart charger system for use with an electronic device which can charge the device while the device is in use and/or continued use. More specifically, and without limitation, the present disclosure relates to a smart charger system for use with an electronic device which can charge the device while the device is in use and/or continued use that improves upon the state of the art and provides for a unique charging experience and method for smart devices so as to maintain ongoing operation of smart and/or electronic devices.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document. Copyright Rajendranath Bhavaniprasad Pande. All rights reserved.

BACKGROUND OF THE DISCLOSURE

Smart watches and other smart devices have grown rapidly in popularity in recent times. A smart device is commonly referred to as an electronic device which is and/or can connect to other devices and/or communicate wirelessly with networked devices. Some examples of smart devices included, but are not limited to, smartphones, smart cars, smart thermostats, smart doorbells, smart locks, smart refrigerators, tablets, smart bands, smart keychains, kitchen appliances, eyeglasses, and smart watches.

Smart watches are becoming increasingly popular and are being used in a variety of circumstances and in a variety of ways. Smart watches vary greatly in size, shape, and functionality but are generally seen as a wearable computer; most commonly worn on the wrist of a user. Smart watches typically provide a touch screen and interface for daily and regular use. Many smartwatches have grown greatly in capability and can handle a variety of tasks, even connecting to wifi, bluetooth, and handling mobile operating systems such as those found on smartphones.

Some of the internal hardware varies among smart watches and the tasks a smart watch performs also varies greatly. Some of these tasks and the like include electronic visual displays which are lit and provide interaction from touch. Additionally, some other functionality ranges from digital cameras to thermometers, to accelerometers, to pedometers, to heart rate monitors to altimeters, to barometers, compasses, global positioning receivers, speakers, storage, and other computing functionality. These smartwatches and the increased capability of smart watches has also increased the demand for a performance in the battery and/or rechargeable battery system of the smart watch.

Rechargeable batteries and the time a rechargeable battery lasts is a great challenge for the smartwatch industry. Users can not use their smart watches while the devices are being charged which hinders the ability of the smart watch to continuously provide services such as sleep tracking, heart rate monitoring, and providing other notifications to a user. For these reasons and others, prolonging battery life and the functionality time available to a user is amongst the holy grail of smart watch capability for high performance and computing devices.

Thus, there is a long-felt need in the art for a longer battery life and for the ability for a smartwatch to continue functioning without having to recharge the device so often. Therefore, the present disclosure, after extensive research and development, has developed and presents a means of electronic watch charging system, a smart charging process, and a smart charger system for use with an electronic device which can charge the device while the device is in use and/or continued use.

The disclosure herein provides these advantages and others as will become clear from the specification and claims provided.

SUMMARY OF THE DISCLOSURE

An electronic watch charging system, a smart charging process, a smart inductive power bank, and a smart charger system for use with an electronic device which can charge the device while the device is in use and/or continued use are presented. More specifically, and without limitation, the present disclosure relates to a smart charger system for use with an electronic device which can charge the device while the device is in use and/or continued use that improves upon the state of the art and provides for a unique charging experience and method for smart devices so as to maintain ongoing operation of smart and/or electronic devices.

Thus, it is a primary object of the disclosure to provide an electronic watch charging system, a smart charging process, and a smart charger system for use with an electronic device which can charge the device while the device is in use and/or continued use that improves upon the state of the art and provides for a unique charging experience and method for smart devices so as to maintain ongoing operation of smart and/or electronic devices.

Another object of the disclosure is to provide an electronic watch charging system, a smart charging process, and a smart charger system for use with an electronic device which can charge the device while the device is in use and/or continued use that remotely charges a smart watch.

Yet another object of the disclosure is to provide an electronic watch charging system, a smart charging process, and a smart charger system for use with an electronic device which can charge the device while the device is in use and/or continued use that recharges a smartwatch without the user having to remove the smartwatch from the users wrist.

Another object of the disclosure is to provide an electronic watch charging system, a smart charging process, and a smart charger system for use with an electronic device which can charge the device while the device is in use and/or continued use that charges a smart device while the device is being worn.

Yet another object of the disclosure is to provide an electronic watch charging system, a smart charging process, and a smart charger system for use with an electronic device which can charge the device while the device is in use and/or continued use that charges a smart device without requiring the smart device to be plugged into a socket.

Another object of the disclosure is to provide an electronic watch charging system, a smart charging process, and a smart charger system for use with an electronic device which can charge the device while the device is in use and/or continued use that is simple and easy to use.

Yet another object of the disclosure is to provide an electronic watch charging system, a smart charging process, and a smart charger system for use with an electronic device which can charge the device while the device is in use and/or continued use that can be used on a daily basis.

Another object of the disclosure is to provide an electronic watch charging system, a smart charging process, and a smart charger system for use with an electronic device which can charge the device while the device is in use and/or continued use that fits underneath a watch being worn so that watch can continue to be used even when charging and simultaneously being worn.

Yet another object of the disclosure is to provide an electronic watch charging system, a smart charging process, and a smart charger system for use with an electronic device which can charge the device while the device is in use and/or continued use that can be recharged and reused.

Another object of the disclosure is to provide an electronic watch charging system, a smart charging process, and a smart charger system for use with an electronic device which can charge the device while the device is in use and/or continued use that includes a connector and smart port for easy recharge.

Yet another object of the disclosure is to provide an electronic watch charging system, a smart charging process, and a smart charger system for use with an electronic device which can charge the device while the device is in use and/or continued use that can be recharged via an inductive charging device.

Another object of the disclosure is to provide an electronic watch charging system, a smart charging process, and a smart charger system for use with an electronic device which can charge the device while the device is in use and/or continued use that can recharge headphones.

Yet another object of the disclosure is to provide an electronic watch charging system, a smart charging process, and a smart charger system for use with an electronic device which can charge the device while the device is in use and/or continued use that can recharge bracelets and other smart devices.

Another object of the disclosure is to provide an electronic watch charging system, a smart charging process, and a smart charger system for use with an electronic device which can charge the device while the device is in use and/or continued use that can recharge during sleeping.

Yet another object of the disclosure is to provide an electronic watch charging system, a smart charging process, and a smart charger system for use with an electronic device which can charge the device while the device is in use and/or continued use that can be used while on the go or in remote locations.

Another object of the disclosure is to provide an electronic watch charging system, a smart charging process, and a smart charger system for use with an electronic device which can charge the device while the device is in use and/or continued use that easily connects to wrist bands.

Yet another object of the disclosure is to provide an electronic watch charging system, a smart charging process, and a smart charger system for use with an electronic device which can charge the device while the device is in use and/or continued use that is flexible.

Another object of the disclosure is to provide an electronic watch charging system, a smart charging process, and a smart charger system for use with an electronic device which can charge the device while the device is in use and/or continued use that provides indicators and backlighting.

Yet another object of the disclosure is to provide an electronic watch charging system, a smart charging process, and a smart charger system for use with an electronic device which can charge the device while the device is in use and/or continued use that works with a variety of charging types.

Another object of the disclosure is to provide an electronic watch charging system, a smart charging process, and a smart charger system for use with an electronic device which can charge the device while the device is in use and/or continued use that tracks historical use.

Yet another object of the disclosure is to provide an electronic watch charging system, a smart charging process, and a smart charger system for use with an electronic device which can charge the device while the device is in use and/or continued use that provides alerts.

Another object of the disclosure is to provide an electronic watch charging system, a smart charging process, and a smart charger system for use with an electronic device which can charge the device while the device is in use and/or continued use that communicates with smart devices.

Yet another object of the disclosure is to provide an electronic watch charging system, a smart charging process, and a smart charger system for use with an electronic device which can charge the device while the device is in use and/or continued use that is easy to use.

Another object of the disclosure is to provide an electronic watch charging system, a smart charging process, and a smart charger system for use with an electronic device which can charge the device while the device is in use and/or continued use that is safe to use.

Yet another object of the disclosure is to provide an electronic watch charging system, a smart charging process, and a smart charger system for use with an electronic device which can charge the device while the device is in use and/or continued use that can carry a full charging amount.

Another object of the disclosure is to provide an electronic watch charging system, a smart charging process, and a smart charger system for use with an electronic device which can charge the device while the device is in use and/or continued use that works with various digital platforms and digital devices.

Yet another object of the disclosure is to provide an electronic watch charging system, a smart charging process, and a smart charger system for use with an electronic device which can charge the device while the device is in use and/or continued use that is quick and efficient.

Another object of the disclosure is to provide an electronic watch charging system, a smart charging process, and a smart charger system for use with an electronic device which can charge the device while the device is in use and/or continued use that saves time for a user and provides convenience for a user.

Yet another object of the disclosure is to provide an electronic watch charging system, a smart charging process, and a smart charger system for use with an electronic device which can charge the device while the device is in use and/or continued use that is high quality.

Another object of the disclosure is to provide an electronic watch charging system, a smart charging process, and a smart charger system for use with an electronic device which can charge the device while the device is in use and/or continued use that is robust.

These and other objects, features, or advantages of the present disclosure will become apparent from the specification and claims.

BRIEF DESCRIPTION OF THE DRAWINGS

The drawings accompanying and forming part of this specification are included to depict certain aspects of the disclosure.

DETAILED DESCRIPTION OF THE DISCLOSURE

Figure 1:
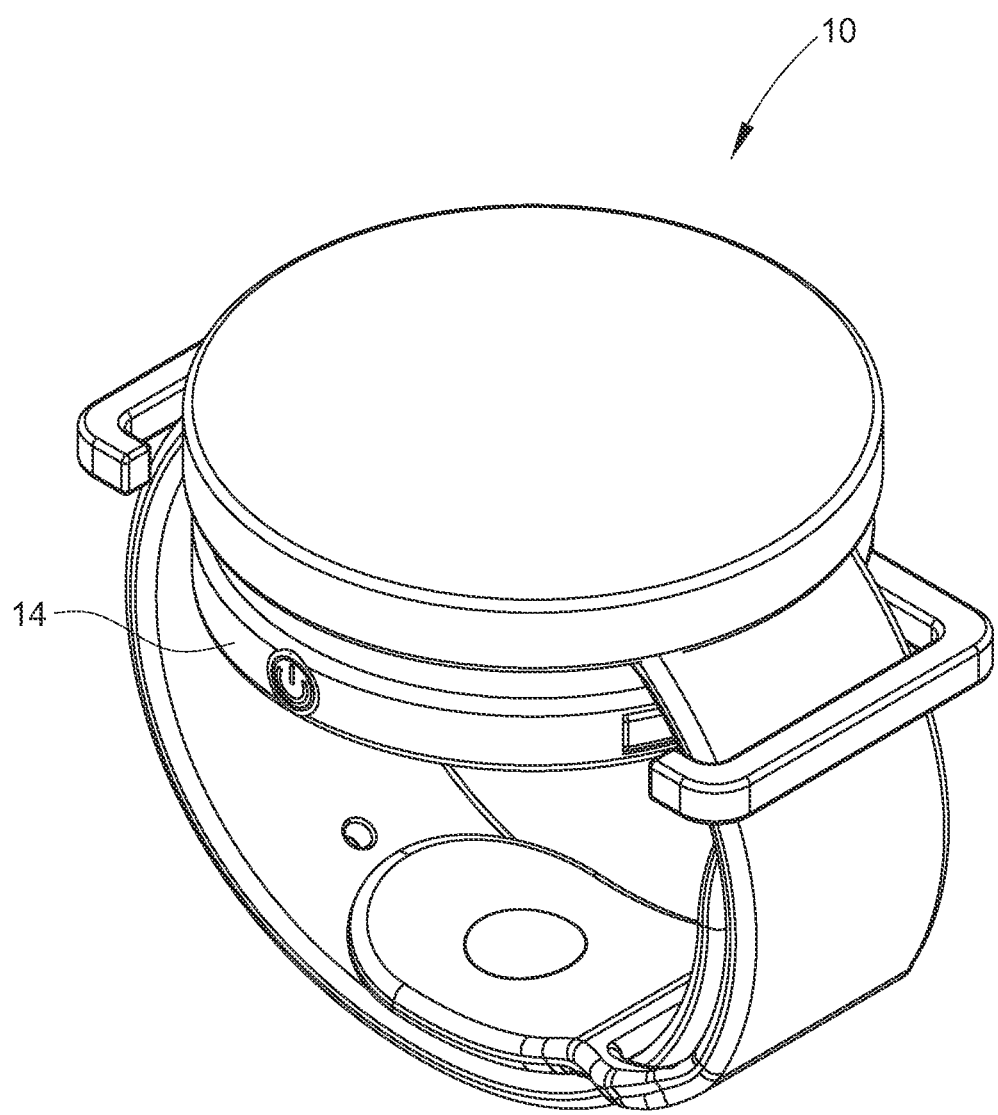
FIG. 1 is a top, perspective view of the charging system; the view showing the charging system engaged with a smart watch.
Figure 2:
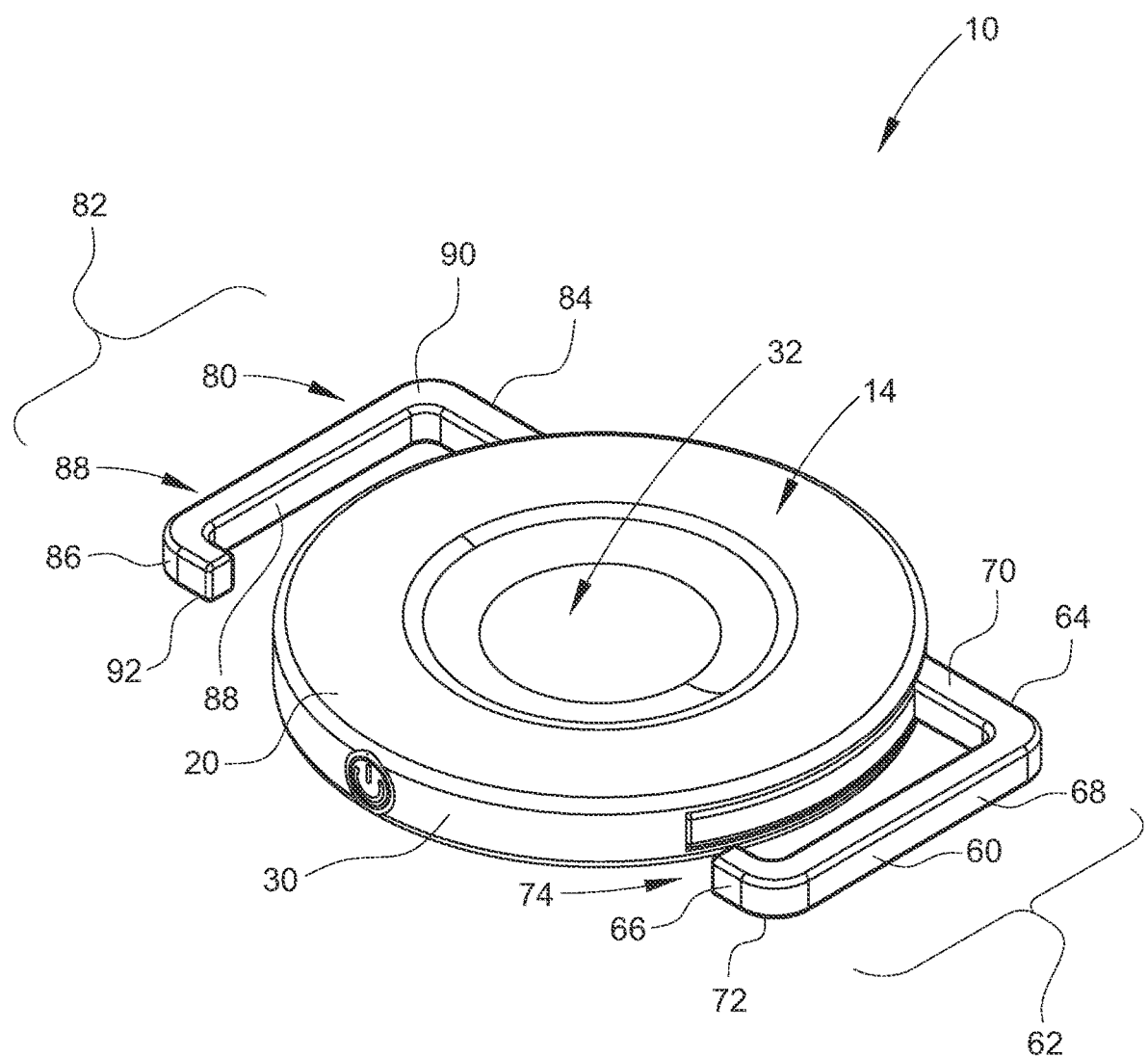
FIG. 2 is a top, perspective view of the charting system; the view showing the charging system having an indicator; the view showing the charging system having a plurality of attachment features.
Figure 3:
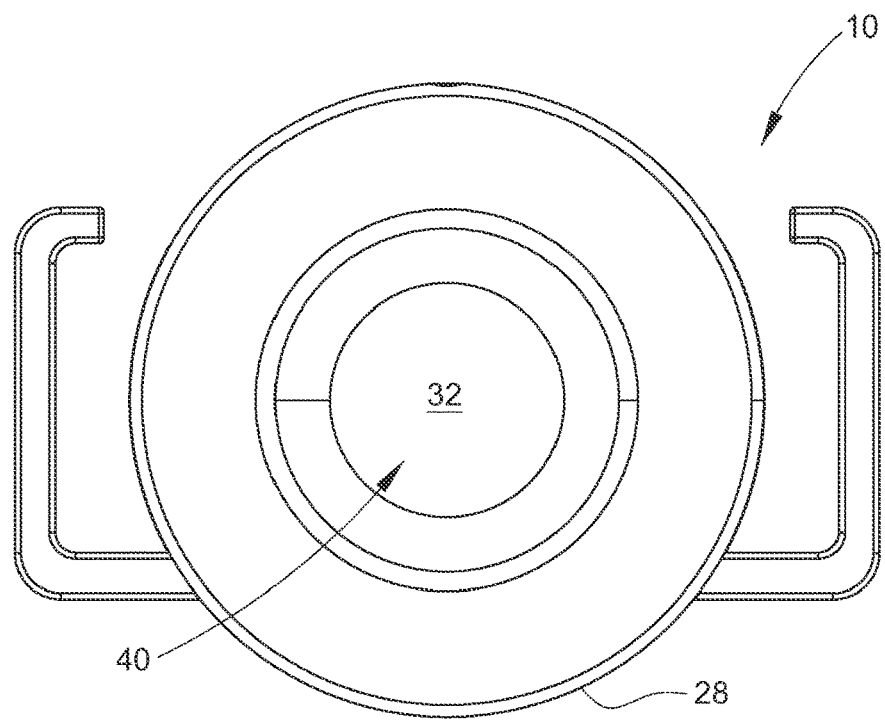
FIG. 3 is a top view of the charting system; the view showing the charging system having a plurality of attachment features.
Figure 4:
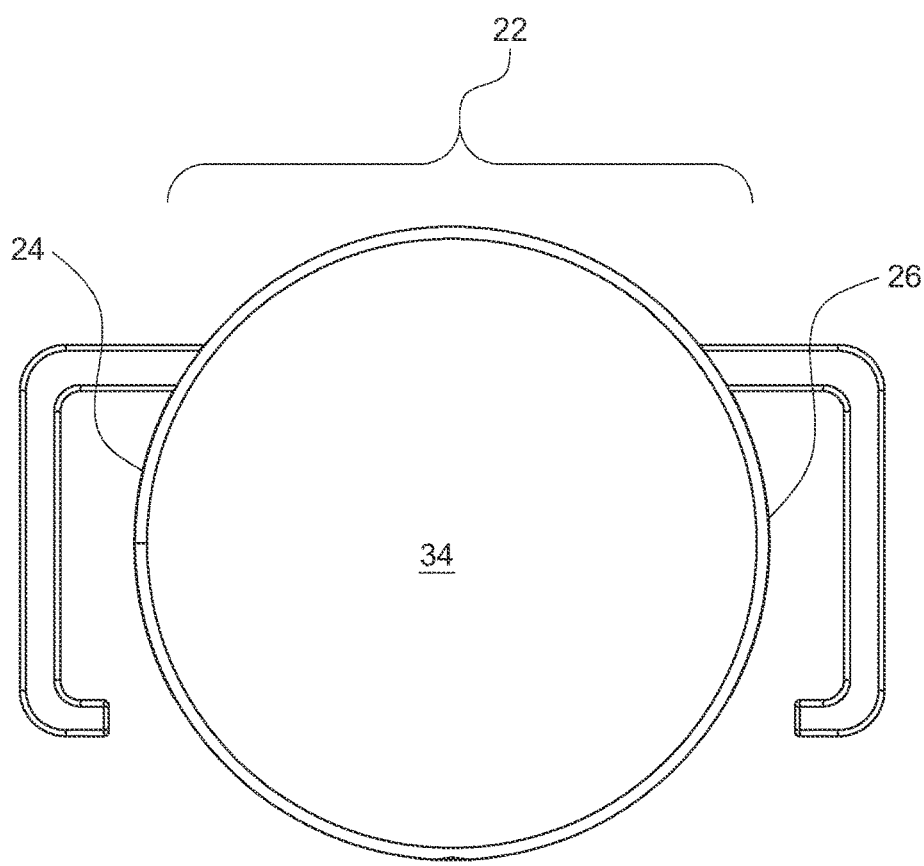
FIG. 4 is a bottom view of the charting system; the view showing the charging system having a plurality of attachment features.
Figure 5:
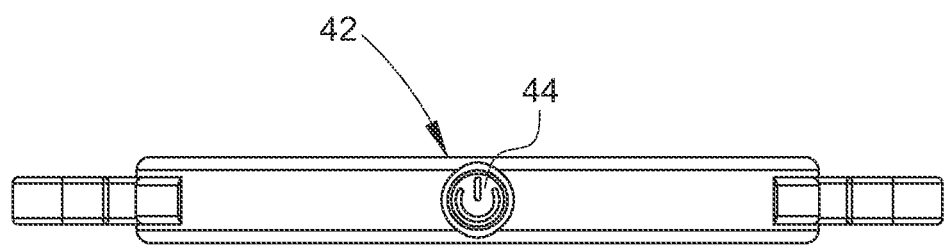
FIG. 5 is a side view of the charting system; the view showing the charging system having an indicator; the view showing the charging system having a plurality of attachment features.
Figure 6:
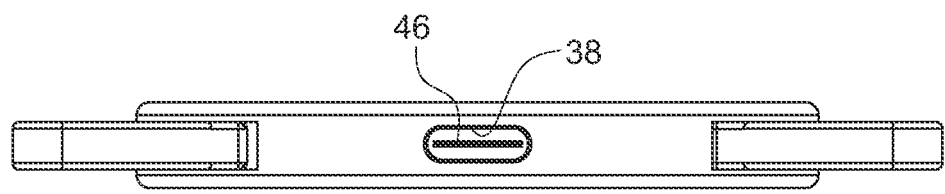
FIG. 6 is a side view of the charting system; the view showing the charging system having a power supply connector for charging the system; the view showing the charging system having a plurality of attachment features.
Figure 7:
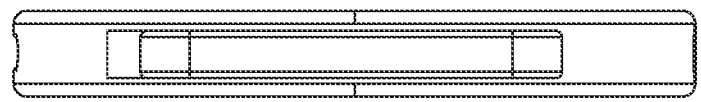
FIG. 7 is a front view of the charging system; the view showing the charging system having a plurality of attachment features.
Figure 8:
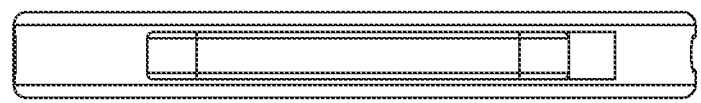
FIG. 8 is a rear view of a charging system; the view showing the charging system having a plurality of attachment features.
Figure 9:
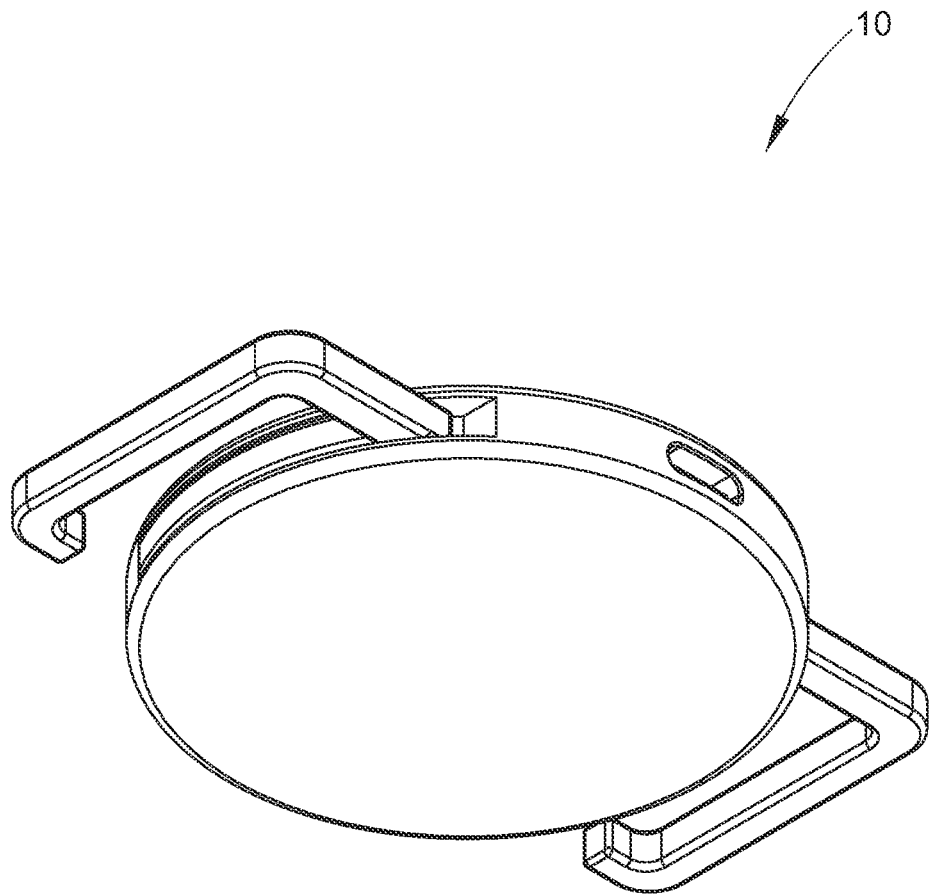
FIG. 9 is a bottom, perspective view of a charging system; the view showing the charging system having a plurality of attachment features.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer removable drive, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

System:

With reference to the figures, an electronic watch charging system, a smart charging process, and a smart charger system for use with an electronic device which can charge the device while the device is in use and/or continued use 10 are presented. electronic watch charging system, a smart charging process, and a smart charger system for use with an electronic device which can charge the device while the device is in use and/or continued use 10 (hereafter referred to as "electronic watch charging system", "watch charging system", "smart charging system", "charging system", or simply "system") is formed of any suitable size, shape and design.

In the arrangement shown, as one example, watch charging system 10 is configured to provide ongoing use of a smart device, such as a smartwatch. Said another way, the present disclosure provides for a smartwatch charging system that provides for the ability to continue to wear and use a smartwatch while charging of the device is taking place. Said another way, system 10 is designed and configured to be worn on a wrist of a user, attaching to a smartwatch, and fitting underneath the smartwatch (or between the wrist of a user and the smartwatch, or in other locations, such that the smartwatch can be charged while the smartwatch is still in use. This allows the smartwatch to continue to be worn and continue to engage in the functionalities being conducted by the smartwatch.

Furthermore, and in the arrangement shown, as one example, system 10 is configured to provide a storage capacity for electricity and/or an inductive power bank. Said another way, system 10 is configured as an inductive power bank for charging smart watches and/or smart bands. Said another way, system 10 is configured to provide power capacity storage for charging a smart watch and/or other electronic devices.

In the arrangement shown, as one example, irregular surface cleaning system 10 may comprise remote servers, databases, application servers, application databases, product databases, mobile applications, and/or computers; all of which in continuity or as separate acts fulfill the functions disclosed herein.

In the arrangement shown, as one example, system 10 includes and/or may include a user, a smart device or smartwatch 14, a main body 20 having a first power supply, a first engagement feature 60, a second engagement feature 80, a second power supply, a computing system 120 and/or remote computing system, an application server, and a mobile computing application, and communication and control components, among other components, features, and functionality.

User (or Plurality Thereof):

In the arrangement shown, as one example, system 10 may also include a user. User may be any user interacting with or utilizing the system 10. This includes, but is not limited to charging and/or recharging system 10 and/or engaging with the charging and/or connections of system 10 to smart devices and the like. This may include viewing, controlling, analyzing, manipulating, and/or interacting with system 10. User is not limited to a single user but may be a plurality of users.

Smart Device:

In the arrangement shown, as one example, system 10 may also include a smart device 14 (also referred to as "device", "smartwatch", "electronic watch", "wearable", or simply "watch"). Wearable 14 is formed of any suitable size, shape, and design, and is configured to provide various services to a user such as the time, heart monitoring, and other configurations. Smart devices vary greatly in size, shape, and function. Some smart devices such as smart watches also provide phone services, texting, gps, and the like. Smart device is not limited to a particular smart watch or wearable system but is a device which can be charged through corded connection and/or inductive charging.

Main Body:

In the arrangement shown, as one example, system 10 includes a main body 20 (also referred to as "charger", "smart charger", or simply "body"). Main body 20 is formed of any suitable size, shape, and design, and is configured to act as the main housing for the components of the system. Said another way, main body 20 is configured to house and hold the various components of system 10, including but not limited to a first power supply.

Said another way, and in the arrangement shown, as one example, main body 20 is the primary component of system 10. In this way, various attachment components, which cause the main body to engage the smart device may be connected to and/or built into the main body 20. Furthermore, the main body 20 is the system which engages in close proximity with the smart device so that the smart device can become charged.

In the arrangement shown as one example, the main body 20 is formed of a sleek design which is configured to fit comfortably on the wrist of the user between the smartwatch and the wrist such that the face of the smartwatch can continue to be engaged on the user. In this way, the smartwatch functionality can still be accessed while the smartwatch is receiving charge and/or recharging via inductive charging from the first power supply within the main body 20.

In the arrangement shown, as one example, the main body 20 is relatively slender so as to be comfortable and fit easily between a smartwatch and the user. In this way, the main body 20 extends a length 22 from a first end 24 to a second end 26 between opposing sides 28—the opposing sides extending approximately the width of a smartwatch. Said another way, the opposing sides are approximately distanced from one another the width of a smartwatch, while the first end and the second end are similarly spaced from the first end and second end of a smartwatch. In this way, the present disclosure includes a number of embodiments which may serve different smartwatch designs and shapes. However, the present disclosure is not limited to these designs but may be in a variety of shapes and sizes, such as square, rectangular, circular and the like. Furthermore, the size may vary to fit comfortably and/or accommodate varying smartwatch and/or smart device sizes. Furthermore, the present disclosure and embodiments are shown that might fit comfortably on the wrist of a user. However, these embodiments can also be sized and shaped for other smart devices in other locations and/or applications.

Furthermore, in the arrangement shown, as one example, main body 20 includes a top surface 32—the surface engaging with the smart device—, a bottom surface 34—or the surface engaging with the wrist of a user and the like—, an exterior surface 36, an interior surface 38 and an inductive charger 40.

In the arrangement shown, as one example, the main body 20 also includes a peripheral edge 30. In one embodiment, the peripheral edge is relatively square with smooth and/or curved edges. In another embodiment the peripheral edge is formed of a circle. The peripheral edge is formed to and may include a plurality of indicator lights 42, a power switch 44, a charge port 46 (for plugging in and charging system 10; however note that system 10 and the first power supply may also charge on a charge pad or inductive charge), and may also include a second charge port which is utilized for connecting to a smart device for faster charging over inductive charging or where a corded connection may be necessary and/or accessory to the inductive charging.

First Power Supply: In the arrangement shown, as one example, the main body 20 also includes a first power supply. First power supply is formed of any suitable size, shape, and design and is configured to hold power and/or charge so as to transmit that charge to a smart device. Said another way, the first power supply is configured to receive power from a plugged in device such as a power cord and/or power pad. Once the charge is received, then the first power supply will hold and/or store the power until the system 10 is connected to and/or placed in close proximity of a smartwatch. The first power supply will then transfer that stored power to the smartwatch through inductive transfer of power and/or through a corded connection.

Said another way, and in the arrangement shown, as one example, the first power supply may be charged in a variety of ways. Some examples, which are disclosed herein, include but are not limited to a USB (universal serial bus), a mini USB, via laptop and/or desktop and/or other smart device connection, a wall plug, a connection to a charger device via a corded connection, an inductive charging device, a combination thereof, or the like.

First Engagement Feature:

In the arrangement shown, as one example, system 10 may also include a first engagement feature 60 (also referred to as "armature", "clasp", or simply "arm"). Clasp is formed of any suitable size, shape, and design, and is configured to engage with the smartwatch so as to secure the main body 20 in place. Additionally, and said another way, the armature is configured so as to put the main body 20 in position so that charging and inductive charging capacity is maximized and maintained. Armature extends a length outwardly from the main body 20 of the system 10.

In the arrangement shown, as one example, the engagement feature is built into the main body 20 of the system 10. However, the armature may also be removable and interchangeable and may come in a variety of colors, shapes, and sizes, and may also be configured to be manipulated for various smart devices.

In the arrangement shown, as one example, the engagement feature is formed of a polymer which is fairly sturdy but with flexibility so as to maintain its shape but also carry a malleability so as to be formed around the straps of the smart device and engage with the smart device in a stable fashion.

Second Engagement Feature:

In the arrangement shown, as one example, system 10 may also include a second engagement feature 60 (also referred to as "armature", "clasp", or simply "arm"). Clasp is formed of any suitable size, shape, and design, and is configured to engage with the smartwatch so as to secure the main body 20 in place. Additionally, and said another way, the armature is configured so as to put the main body 20 in position so that charging and inductive charging capacity is maximized and maintained. Armature extends a length outwardly from the main body 20 of the system 10.

In the arrangement shown, as one example, the engagement feature is built into the main body 20 of the system 10. However, the armature may also be removable and interchangeable and may come in a variety of colors, shapes, and sizes, and may also be configured to be manipulated for various smart devices.

In the arrangement shown, as one example, the engagement feature is formed of a polymer which is fairly sturdy but with flexibility so as to maintain its shape but also carry a malleability so as to be formed around the straps of the smart device and engage with the smart device in a stable fashion.

In the arrangement shown, with reference to the figures and in one embodiment, the first and second armatures together form a C-shape. In this embodiment, the two armatures face in the same lateral direction. However, in another embodiment, the armatures are reversal in direction and/or manufactured in opposite directions. This arrangement is referred to as the S-shape arrangement. In this embodiment, the armatures face in opposite lateral directions so as to appear as an S-shape when viewed from above.

Second Power Supply:

In the arrangement shown, as one example, system 10 includes a second power supply (also referred to as "wall charger", "solar charger", or simply "corded power supply"). Second power supply is formed of any suitable size, shape, and design, and is configured to provide power and/or recharging to system 10.

In the arrangement shown, as one example, second power supply is formed of a corded power supply which plugs into the charge port of the main body 20 and also plugs into a wall and/or outlet power supply. Alternatively, second power supply may also be a charge pad and/or induction charger which the main body 20 can come into contact and/or close proximity with so that the second power supply can recharge the plurality of rechargeable batteries of the first power supply.

Onboard Computing System:

In one arrangement, as is shown, system 10 may also include an onboard computing system (or "onboard computing device"). Onboarding computing system is formed of any suitable size, shape, and design and configured to handle onboard computing operations, as are necessary for the operation of system 10. Onboarding computing device is connected with electronic network and/or database and/or server or cloud via communication means, bluetooth communication, bluetooth low energy chip (BLE onboard), and may include a processor, a memory, a microcontroller, a printed circuit board, a microprocessor, a receiver/transceiver, may include at least one antenna, and a global positioning system, among other components.

In addition to the above identified features, options, controls, and components, system 10 may also include other features and functionalities, among other options, controls, and components.

What is claimed:

1. A charging system, comprising: a charger; wherein the charger is capable of storing a charge; wherein the charger receives a charge from a power supply; wherein the charger delivers the charge to a smart watch; the charger having a plurality of attachment features; wherein the plurality of attachment features fit around a plurality of straps which hold the smart watch in place on a wrist of a user; wherein each of the plurality of attachment features extend a length from a first end to a second end: wherein the first end of each of the plurality of attachment features is connected to a main body of the charger: wherein the second end of each of the plurality of attachment features is formed of an opening such that the plurality of straps of the smart device can slide through the opening of the second end of each of the plurality of attachment features: wherein the plurality of attachment features slide across the width of the plurality of straps.

2. The system of claim 1, further comprising: wherein the charger is fit between the smartwatch and the wrist of the user.

3. The system of claim 1, further comprising:
the charger having a charge port capable of receiving a charging cord connection so power can be supplied from the power supply.

4. The system of claim 1, further comprising:
wherein the charger is circular in shape.

5. The system of claim 1, further comprising:
wherein the charger is relatively square in shape.

6. The system of claim 1, further comprising: wherein the charger can be in use, delivering charge to the smart watch while the smart watch is in use.

7. The system of claim 1, further comprising: a Bluetooth connectivity for connecting to the smart watch.

8. The system of claim 1, further comprising: wherein the charge is delivered from the charger to the smart device by inductive charging.

9. The system of claim 1, further comprising: wherein a charge is delivered from the power supply to the charger by one of the following: wherein the charge is delivered from the power supply to the charger by inductive charging; or wherein the charge can be delivered from the power supply to the charger by a cord; or wherein the charge can be delivered from the power supply to the charger by a cord while the charger is delivering power to the smartwatch by inductive charging, via a charge port; wherein the charge port is located on the side of the charger.

10. A smart charging system for use with a smart watch, comprising: a charger; wherein the charger is capable of storing a charge; wherein the charger receives a charge from a power supply; wherein the charger delivers the charge to the smart watch; the charger having a plurality of attachment features; wherein the charger fits underneath the smart device while the smart device is in use; wherein the plurality of attachment features fit around a plurality of straps which hold the smart watch in place on a wrist of a user; wherein the plurality of attachment features include more than one attachment feature; wherein the plurality of attachment features each extend a length from a first end to a second end; wherein the first end of each of the plurality of attachment features is connected to a main body of the charger; wherein the second end of each of the plurality of attachment features is formed of an opening such that the plurality of straps of the smart watch can slide through the opening of the second end of each of the plurality of attachment features: wherein the plurality of attachment features slide across the width of the plurality of straps.

11. The system of claim 10, further comprising: wherein the charger is fit between the smart watch and the wrist of the user.

12. The system of claim 10, further comprising: the charger having a charge port capable of receiving a charging cord connection so power can be supplied from the power supply; the charger having a power switch located on the side of the charger: wherein the power switch is configured to activate charging and deactivate charging; wherein the power switch is configured to activate a Bluetooth connection and deactivate the Bluetooth connection; wherein the power switch is accessible to the user while the charger is in use between the wrist of the user and the smart watch.

13. The system of claim 10, further comprising:
wherein the charger is circular in shape.

14. The system of claim 10, further comprising:
wherein the charger is relatively square in shape.

15. The system of claim 10, further comprising:
wherein the charger can be in use, delivering charge to the smart device while the smart device is in use;
wherein a charge is delivered from the charger to the smart device by inductive charging.

16. A method of recharging a smart watch, the steps comprising: providing a charger, the charger having a capacity and a plurality of attachment features; wherein each of the plurality of attachment features extend a length from a first end to a second end: wherein the first end of each of the plurality of attachment features is connected to a main body of the charger: wherein the second end of each of the plurality of attachment features is formed of an opening such that a plurality of straps of the smart watch can slide through the opening of the second end of each of the plurality of attachment features: wherein the plurality of attachment features slide across the width of the plurality of straps; charging the charger with a charge; placing the charger between the smart watch and a wrist of a user while the smart watch is being worn by the user; delivering charge to the smart watch while the smart watch is in use.

17. The system of claim 10, further comprising: the plurality of attachment features including a first attachment feature; the first attachment feature extending a length from a first end to a second end; the first attachment feature extending out perpendicular from the side of the charger, wherein the first attachment feature turns at approximately 90 degrees, wherein the first attachment feature runs a parallel length to the charger, wherein the first attachment feature arches toward the charger; the first attachment feature having an opening for accepting the plurality of straps of the smart watch therebetween; the plurality of attachment features including a second attachment feature; the second attachment feature extending a length from a first end to a second end; the second attachment feature extending a length from a first end to a second end; the second attachment feature extending out perpendicular from the side of the charger, wherein the second attachment feature turns at approximately 90 degrees, wherein the second attachment feature runs a parallel length to the charger, wherein the second attachment feature arches toward the charger; the second attachment feature having an opening for accepting the plurality of straps of the smart watch therebetween.

18. The system of claim 17, further comprising:
wherein the first attachment feature and the second attachment feature form a C-shape and face a same side of the charger.

19. The system of claim 17, further comprising:
wherein the first attachment feature and the second attachment feature form an S-shape and face an opposite side of the charger.

* * * * *